UNITED STATES PATENT OFFICE.

VITTORIO BOLLO AND ETTORE CADENACCIO, OF GENOA, ITALY.

PROCESS FOR THE REDUCTION OF SULFATES.

1,045,769.

Specification of Letters Patent. Patented Nov. 26, 1912.

No Drawing. Application filed November 21, 1910. Serial No. 593,540.

*To all whom it may concern:*

Be it known that we, VITTORIO BOLLO, chemist, and ETTORE CADENACCIO, manufacturer, both subjects of the King of Italy, and residents of Genoa, Italy, have invented a certain new and useful Process for the Reduction of Sulfates, of which the following is a specification.

The present invention relates to a process for reducing sulfates of the alkalis and of the alkaline earths into their corresponding sulfids by means of the action of certain catalyzing agents.

In order to obtain the conversion of the sulfates of the alkalis and of the alkaline earths unto their corresponding sulfids, each sulfate to be converted is intimately mixed with a small quantity of one or more salts of one or more catalyzing agents, for instance, of an iron salt (ferrous or ferric salt). The said salt or salts are preferably added in a moist way and in solution (with a view of obtaining the most subdivided and uniform possible distribution), then the hydrated oxid of the added salt is precipitated by any of the well known chemical methods, (unless the salt employed be such a one which at a relatively low temperature yields by itself the corresponding oxid.) As for example, when ferrous sulfate is dissolved in water, it gradually changes to the hydrated oxid. We prefer, however, to precipitate the hydrated oxid by means of milk of lime.

Instead of precipitating the hydrated oxid in the mass itself or of generating in the latter the oxid of the respective salt by heating, one might add to the mass oxids of one or more catalyzing agents (as in the example cited, oxid of iron), or the catalyzing metals themselves.

The mass after having been dried to a suitable degree is introduced into suitable furnaces, then heated out of contact with air to a relatively low temperature and during a relatively short space of time subjected to the action of a current of a reducing gas.

In this process, the substance added, for instance iron does not exert its action at the expense of the sulfate treated and by transferring thereafter the oxygen (taken from the sulfate) to the reducing gas, but on the contrary acts in a catalytic manner which has been proven by the fact that only from 0.04 to 0.15 per cent. of iron—that is we find that in carrying out our process only a small percentage of iron is necessary to make the necessary reduction—is necessary for bringing about the reduction, which reduction does not take place (all other conditions being the same) if the mass to be treated is deprived of iron. For example the reaction herein involved is supposed to be as follows:

$$BaSO_4 \times CH_4 = BaS \times CO_2 \times 2H_2O,$$

whereas in the ordinary reduction process the reaction is as follows:

(a) $4BaSO_4 \times 8Fe \times CH_4 = 4BaS \times 4Fe_2O_3 \times CO_2 \times 2H_2O$ (b) $4Fe_2O_3 \times 3CH_4 = 8Fe \times 3CO_2 \times 6H_2O$ In the latter case, about 48% of iron is necessary to bring about the reaction, whereas in the former case only from .04 to .15% is required.

One may employ, as a catalyzing medium, besides the iron and its oxids or hydrated oxids (or iron salts adapted to yield an oxid at a relatively low temperature), manganese, nickel, cobalt, copper, chromium and the other catalyzing metals, which may be utilized in industry, and their respective compounds having a catalytic action. Instead of the catalytic mediums specified, steam might be employed in suitable proportions, this steam being introduced into or produced in any suitable manner in the mass to be treated.

Instead of subjecting the sulfate to the action of a current of reducing gases, carbon (coal, cokes, charcoal, etc.) or tar or another organic substance might be mixed with the sulfate (besides the catalyzing medium) and the mass be heated in a suitable manner; however, in this case, the percentage of sulfid produced would be less and the treatment by heat ought to be of a longer duration than in the form of embodiment described in the first instance. Finally if the sulfate to be reduced, mixed with the required amount of a catalyzing agent and carbon (coal, cokes, charcoal, etc.) or organic substances, is subjected to thermo-electric action (either by means of the electric arc furnaces or by means of the electric resistance furnace) the consumption of electric energy is much reduced when compared with the consumption which would be experienced if the process were carried out without the addition of a catalyzing agent, effected in the manner above described and for the purpose specified. If the said sulfids are treated by executing the catalysis (always out of the contact with air) in the electric resistance furnace which has been suitably disposed and controlled, one may also employ the vapors and the reducing gases besides the other reducing substances, and in this case too, a considerable lowering of the temperature of reaction is experienced, besides a large reduction in the duration of the operation.

Having now fully described our said invention, what we claim and desire to secure by Letters Patent is:

1. A process for reducing sulfates of the alkalis and of the alkaline earths into their respective sulfids consisting in heating the material in the presence of a reducing agent and a small quantity of a suitable catalytic agent adapted to materially reduce by its catalytic action the temperature and time heretofore necessary to bring about this reduction.

2. A process for reducing sulfates of the alkalis and of the alkaline earths into their respective sulfids, consisting in heating the material in suitable furnaces out of contact with air in the presence of a small quantity of a catalyzing agent and subjecting the same during the operation to the action of a reducing agent, substantially as and for the purpose set forth.

3. A process for reducing sulfates of the alkalis and of the alkaline earths into their respective sulfids consisting in mixing the sulfate to be treated intimately with a small quantity of a catalyzing compound, precipitating the hydrated oxid of said compound in the mass, drying the mass thus obtained and finally heating it in suitable furnaces out of contact with air and subjecting the same during the heating operation to the action of a reducing agent.

4. A process for reducing sulfates of the alkalis or the alkaline earths into their respective sulfids consisting in intimately mixing the sulfate to be treated with a small quantity of the oxid of a catalyzing metal, and heating the mass in a suitable manner, in the presence of a reducing agent, substantially as and for the purpose set forth.

5. A process for reducing sulfates of the alkalis or the alkaline earths into their respective sulfids consisting in treating the sulfate to the action of catalyzing agents, and subjecting the mass during the heating operation to the action of a reducing agent for a relatively short space of time substantially as and for the purpose set forth.

6. A process for reducing sulfates of the alkalis or the alkaline earths into their sulfids consisting in heating the sulfate to be treated in the presence of a suitable catalyzing medium and carbonaceous material in an electric arc furnace, substantially as and for the purpose set forth.

In testimony whereof we have hereunto set our hands in presence of two witnesses.

VITTORIO BOLLO.
ETTORE CADENACCIO.

Witnesses:
ANGELO BORAGUINO,
C. A. JARRAR.